US009241051B1

(12) United States Patent
Peterson, III

(10) Patent No.: US 9,241,051 B1
(45) Date of Patent: Jan. 19, 2016

(54) CELL PHONE CASE FOR SELECTIVELY BLOCKING SOUND AND VIDEO INPUT

(71) Applicant: Christian A. Peterson, III, West Babylon, NY (US)

(72) Inventor: Christian A. Peterson, III, West Babylon, NY (US)

(*) Notice: Subject to any disclaimer, the term of this patent is extended or adjusted under 35 U.S.C. 154(b) by 32 days.

(21) Appl. No.: 14/159,063

(22) Filed: Jan. 20, 2014

(51) Int. Cl.
*H04M 1/00* (2006.01)
*H04M 1/02* (2006.01)

(52) U.S. Cl.
CPC .................................. *H04M 1/0264* (2013.01)

(58) Field of Classification Search
CPC .................................. H05K 9/00; H05K 13/00
USPC .................................................... 455/575.8
See application file for complete search history.

(56) References Cited

U.S. PATENT DOCUMENTS

| | | | |
|---|---|---|---|
| 8,297,601 B2 | 10/2012 | Vito et al. | |
| 8,369,494 B2 | 2/2013 | Cha | |
| 8,412,123 B2 | 4/2013 | Foster | |
| 8,418,852 B2 | 4/2013 | Ziemba | |
| 2006/0099837 A1* | 5/2006 | Cheng | H05K 5/0004 439/131 |
| 2010/0008028 A1* | 1/2010 | Richardson et al. | 361/679.01 |
| 2011/0077061 A1* | 3/2011 | Danze | H04M 1/185 455/575.1 |
| 2012/0220285 A1 | 8/2012 | Shaw et al. | |
| 2012/0244918 A1 | 9/2012 | Hall | |
| 2012/0258779 A1 | 10/2012 | Ripes | |
| 2012/0261930 A1 | 10/2012 | Bethea | |
| 2012/0314354 A1* | 12/2012 | Rayner | 361/679.01 |
| 2013/0015081 A1* | 1/2013 | Wu | A45C 11/00 206/216 |

* cited by examiner

*Primary Examiner* — Thomas Lett
(74) *Attorney, Agent, or Firm* — Richard L. Miller

(57) ABSTRACT

A case that replaceably encloses a cell phone having at least one audio input and at least one video input and selectively prevents access to the at least one audio input of the cell phone and to the at least one video input of the cell phone by a hacker. The case includes a back portion, a front portion, and barriers. The front portion is pivotally attached to the back portion. The front portion and the back portion replaceably enclose the cell phone. The barriers are movably attached to the back portion and to the front portion and selectively prevent access to the at least one audio input of the cell phone and to the at least one video input of the cell phone by the hacker. The front portion is either pivotally attached to the back portion or is affixed to the back portion.

37 Claims, 12 Drawing Sheets

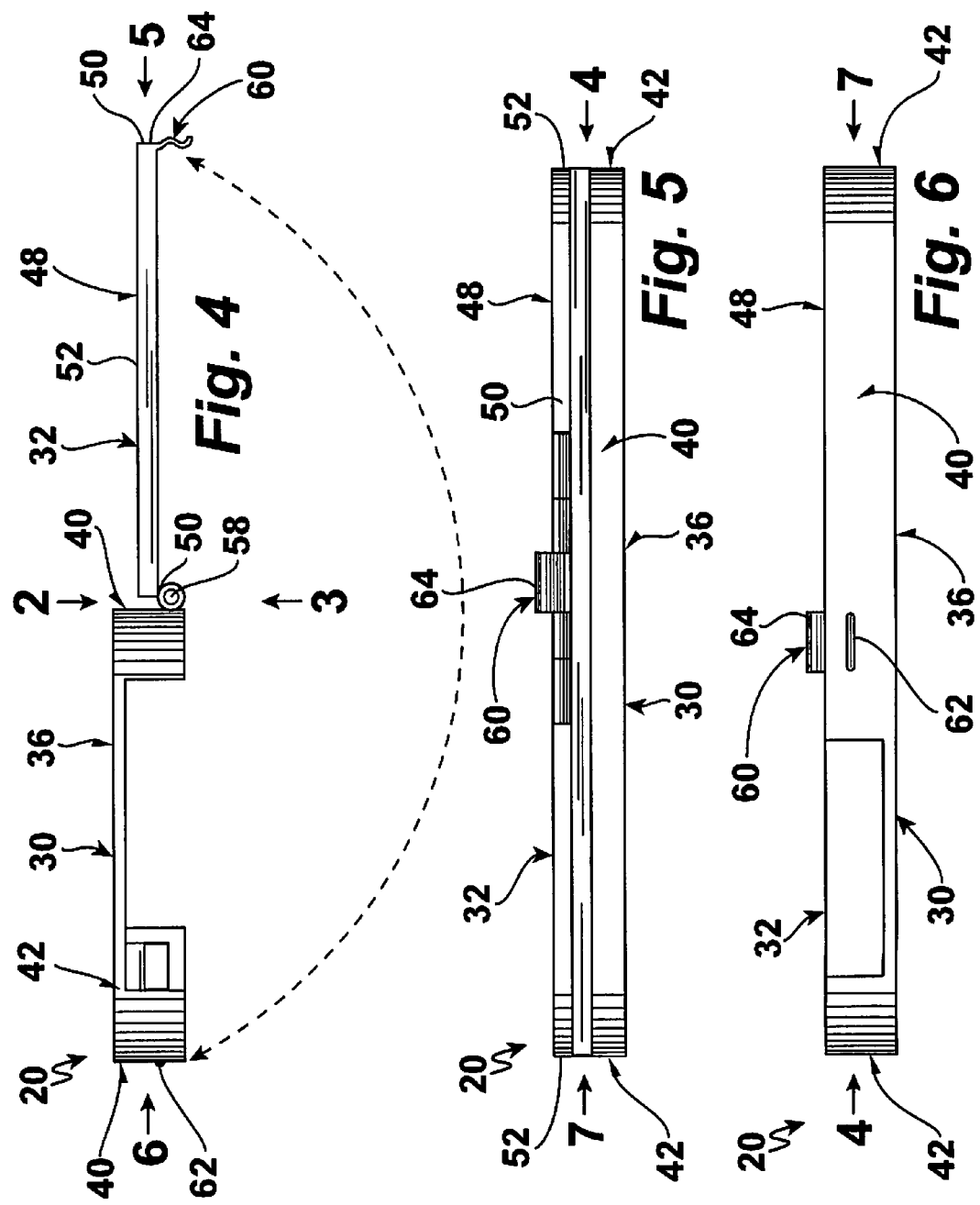

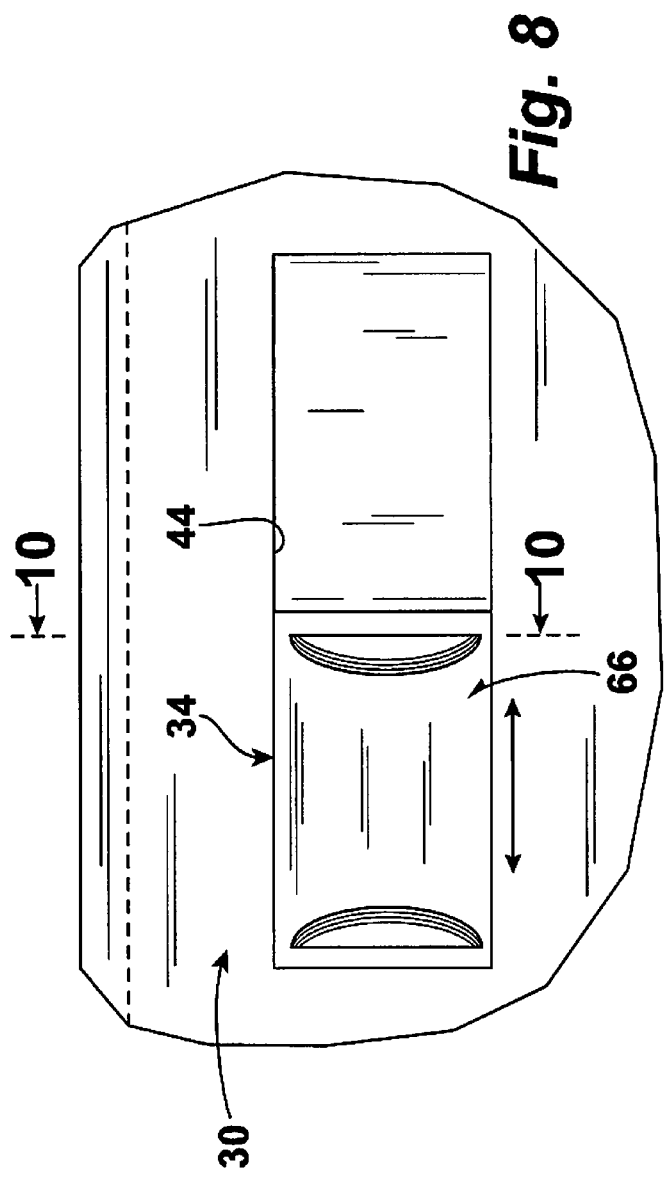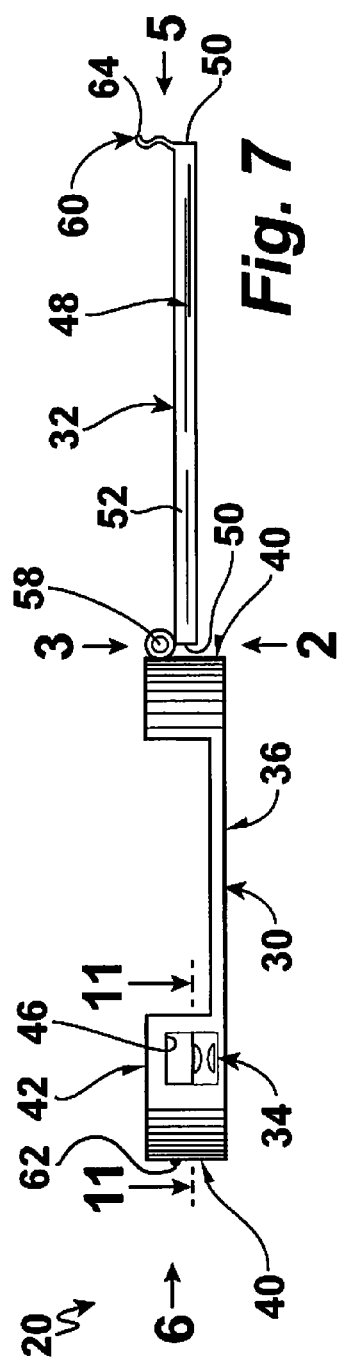

CELL PHONE CASE FOR SELECTIVELY BLOCKING SOUND AND VIDEO INPUT

BACKGROUND OF THE INVENTION

1. Field of the Invention

The present invention relates to a cell phone case, and more particularly, a cell phone case for selectively blocking sound and video input.

2. Description of the Prior Art

Numerous innovations for electronic device cases have been provided in the prior art that will be described. Even though these innovations may be suitable for the specific individual purposes to which they address, however, they differ from the present invention.

A FIRST EXAMPLE, U.S. Pat. No. 8,297,601, Issued on Oct. 30, 2012, to Vito, et al. teaches a material adapted to reduce vibration and, more specifically, to a material adapted to dissipate and evenly distribute transmitted vibrations. The material is particularly suited for impact and/or heavy load vibration resistance.

A SECOND EXAMPLE, U.S. Pat. No. 8,369,494, Issued on Feb. 5, 2013, to Cha teaches a system and method for a selective ring silencer that prevents people from having to listen to the telephone ring on and on with nuisance calls. The ringer silencer can be discretely constructed from a telephone, part of a telecommunication device, or part of a central telephone network construction. A receiver demodulates an incoming call. Control logic reads at least a portion of the called identification (CID) data and determines an action based on the reading. A switch, in communication with the control logic, is actuated to a first state that allows the communication data to be output from the ring silencer, and a second state that blocks the communication data from being output from the ring silencer to a user's communication device. The control logic blocks toll-free area codes originated calls from ringing a user's telephone, optionally forwarding the call to a voice mail module.

A THIRD EXAMPLE, U.S. Pat. No. 8,412,123, Issued on Apr. 2, 2013, to Foster teaches a radio opaque container for communication devices upon a vehicle, which has a bottom joined to four walls, a pivoting lid sealing upon the walls, a connector from the container to a vehicle, a locking mechanism keeping the lid closed, and circuitry between the locking mechanism and the vehicle, which engages the locking mechanism only when the vehicle's electrical system is on. In an emergency, the contents within the container remain available to a vehicle operator but the container opens only when vehicle's electrical power has been turned off. The container forms at least one Faraday cage around the contents and prevents equipment placed therein from activating and distracting a vehicle operator. In an alternate embodiment, the container includes a shelf therein.

A FOURTH EXAMPLE, U.S. Pat. No. 8,418,852, Issued on Apr. 16, 2013, to Ziemba teaches a compartmentalized protective case that houses a portable electronic device and personal care items that are organized and held securely therewithin. The compartmentalized protective case has a major compartment for receiving and housing an electronic device, such as a smart phone, cellular phone, music player, or other digital media device. At least one cell compartment, constructed within the case, receives and houses personal care items removably integrated therein. Personal care items can include at least one interchangeable replacement cell containing beauty items, cosmetics, hygienic items, oral care products, such as floss or breath strips, medications, vitamins, breathe fresheners, and/or health care products. A second cell compartment is, preferably, provided as a removable pouch or may contain a restraining system for holding identification cards, currency, visa or bank cards, and/or keys.

A FIFTH EXAMPLE, U.S. Patent Office Document No. 2012/0220285, Published on Aug. 30, 2012, to Shaw, et al. teaches a system, method, and apparatus for protecting privacy when a mobile device is located in a defined privacy zone. The available features that a user of a mobile device may use are controlled while the mobile device is located in a define privacy zone. Once a mobile device is detected in the define privacy zone, a database is accessed to determine if the mobile device has the features available that are to be disabled. If the features are available, a disable signal is sent via the communications network to the mobile device and the feature is disabled. Once the mobile device is detected to be outside of the defined privacy zone, the previously disabled mobile device feature is enabled.

A SIXTH EXAMPLE, U.S. Patent Office Document No. 2012/0244918, Published on Sep. 27, 2012, to Hall teaches a cell phone case having a reflective device and a storage compartment for other items.

A SEVENTH EXAMPLE, U.S. Patent Office Document No. 2012/0258779, Published on Oct. 11, 2012, to Ripes teaches a holder for a mobile telecommunications device, which is designed to reduce distraction to the driver that securely encloses and envelopes the mobile telephone in a sound, vibration, and shock dampening material. The mobile telecommunications device is enclosed within a foam-lined container, thereby muffling sounds and vibrations emitted by the mobile telephone and reducing distractions to a driver. The holder provides a protective storage receptacle for the mobile telephone in the passenger compartment of a vehicle and decreases distractions to a driver of the vehicle from the mobile telecommunications device, while maintaining the mobile telecommunications device in a functioning state and in a convenient and readily accessible location in the vehicle.

AN EIGHTH EXAMPLE, U.S. Patent Office Document No. 20120261930, Published on Oct. 18, 2012, to Bethea teaches a holding device for a phone or other electronic device. The device has an exterior housing and a generally hollow interior. The back of the exterior housing has a plurality of finger receiving finger loops that pivot from a generally parallel position with respect to the back of the device to a generally perpendicular position with respect to the back of the device. The finger loops may move independently and be independently added or removed from the device.

It is apparent now that numerous innovations for electronic device cases have been provided in the prior art that adequate for various purposes. Furthermore, even though these innovations may be suitable for the specific individual purposes to which they address, accordingly, they would not be suitable for the purposes of the present invention as heretofore described.

SUMMARY OF THE INVENTION

AN OBJECT of the present invention is to provide a cell phone case for selectively blocking sound and video input that avoids the disadvantages of the prior art.

ANOTHER OBJECT of the present invention is to provide a cell phone case for selectively blocking sound and video input that is simple and inexpensive to manufacture.

STILL ANOTHER OBJECT of the present invention is to provide a cell phone case for selectively blocking sound and video input that is simple to use.

BRIEFLY STATED, STILL YET ANOTHER OBJECT of the present invention is to provide a case that replaceably encloses a cell phone having at least one audio input and at least one video input and selectively prevents access to the at least one audio input of the cell phone and to the at least one video input of the cell phone by a hacker. The case includes a back portion, a front portion, and barriers. The front portion is attached to the back portion. The front portion and the back portion replaceably enclose the cell phone. The barriers are movably attached to the back portion and to the front portion and selectively prevent access to the at least one audio input of the cell phone and to the at least one video input of the cell phone by the hacker. The front portion is either pivotally attached to the back portion or is affixed to the back portion.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawings are briefly described as follows:

FIG. 4 is a top edge elevational view taken in the direction of arrow 4 in FIG. 3;

FIG. 5 is a right edge elevational view taken in the direction of arrow 5 in FIG. 3;

FIG. 6 is a left edge elevational view taken in the direction of arrow 6 in FIG. 3;

FIG. 7 is a bottom edge elevational view taken in the direction of arrow 7 in FIG. 3;

FIG. 8 is an enlarged diagrammatic view of the area enclosed in the dotted ellipse indicated by arrow 8 in FIG. 2 of the door for blocking of any input image information to camera located on the rear side of the cell phone when installed in the case;

Figure 1:
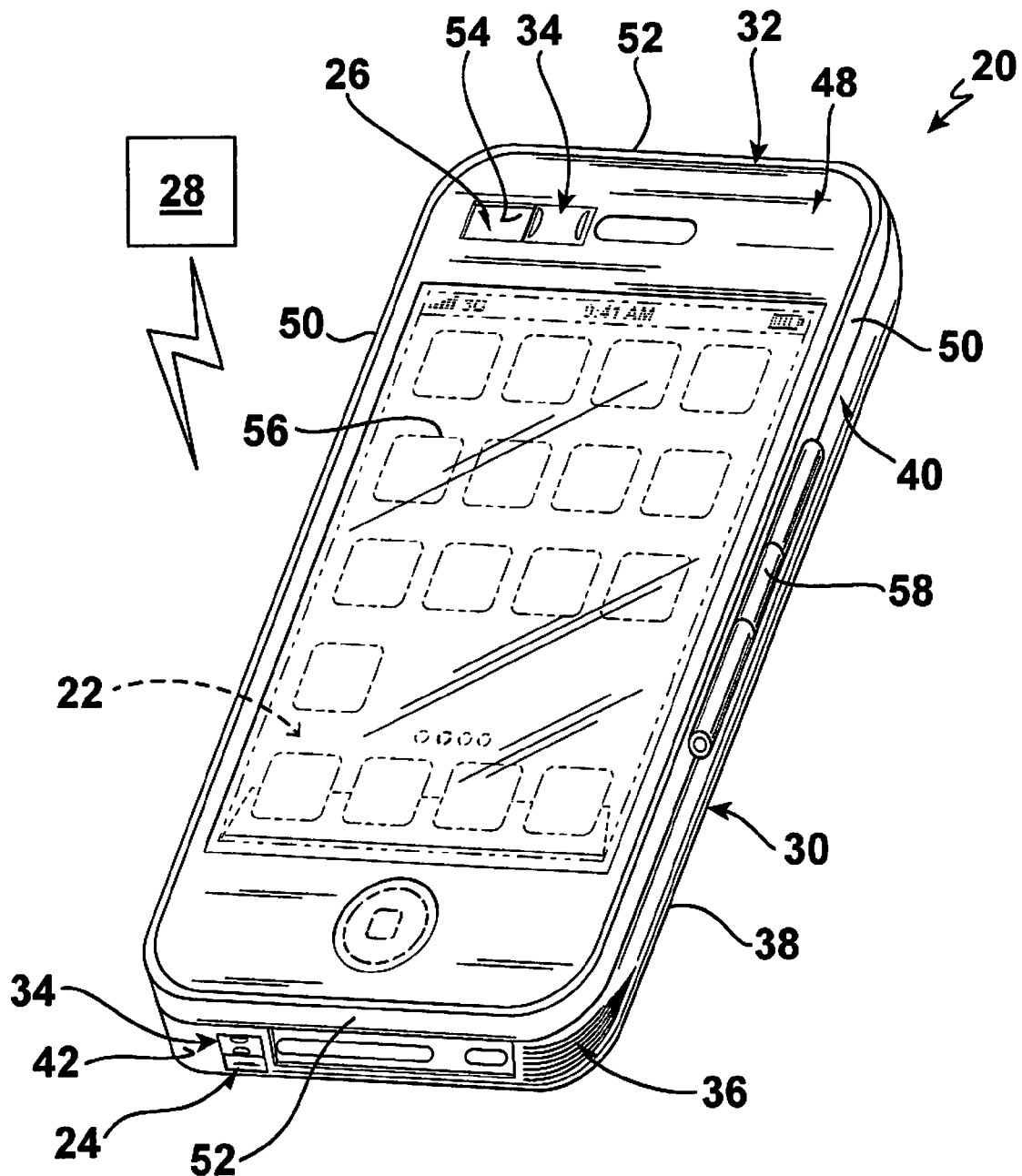
FIG. 1 is a diagrammatic perspective of a cell phone case of a first embodiment of the present invention illustrated with a cell phone installed therein shown in phantom in the case.
Figure 2:
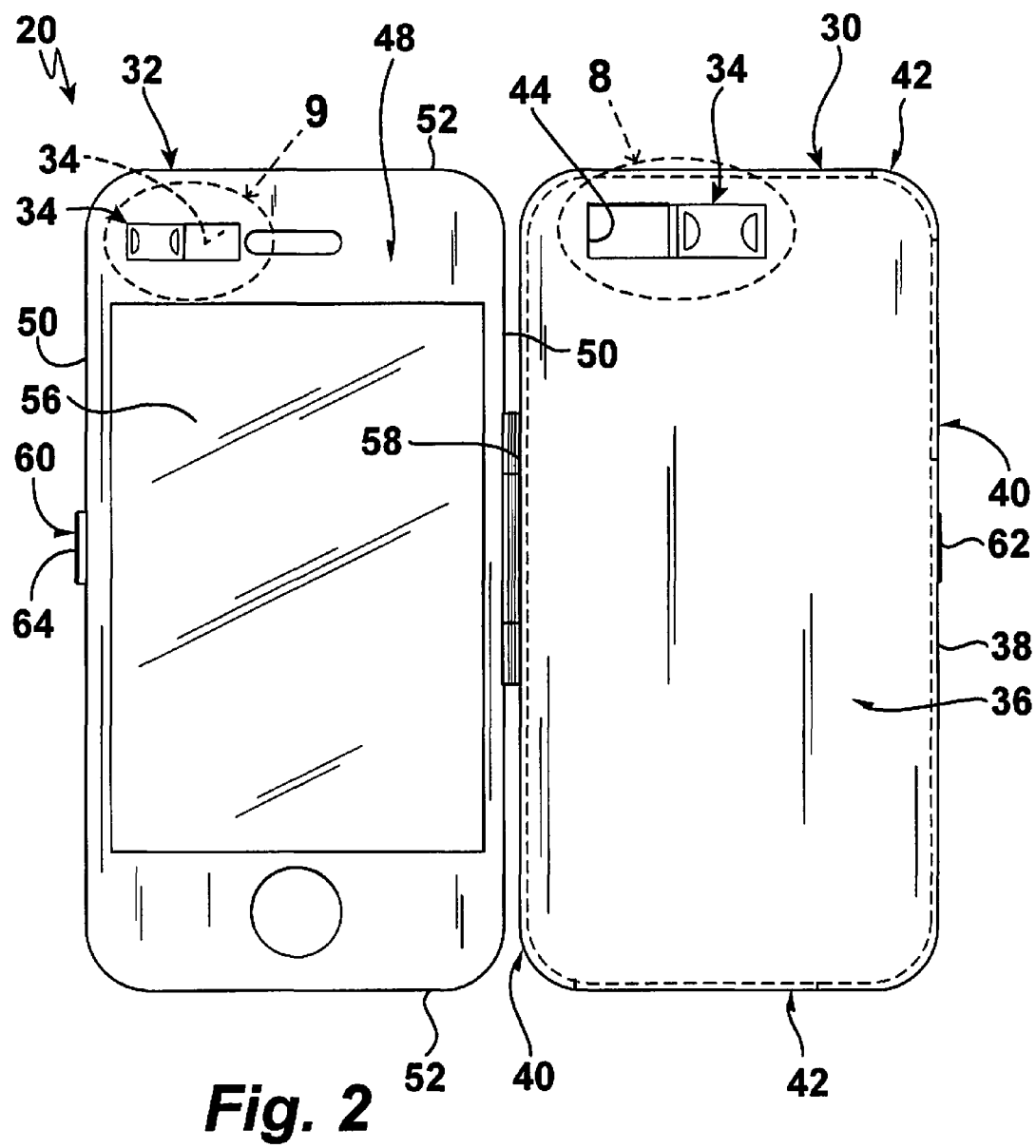
FIG. 2 is a plan view of the outside of the case per se when empty.
Figure 3:
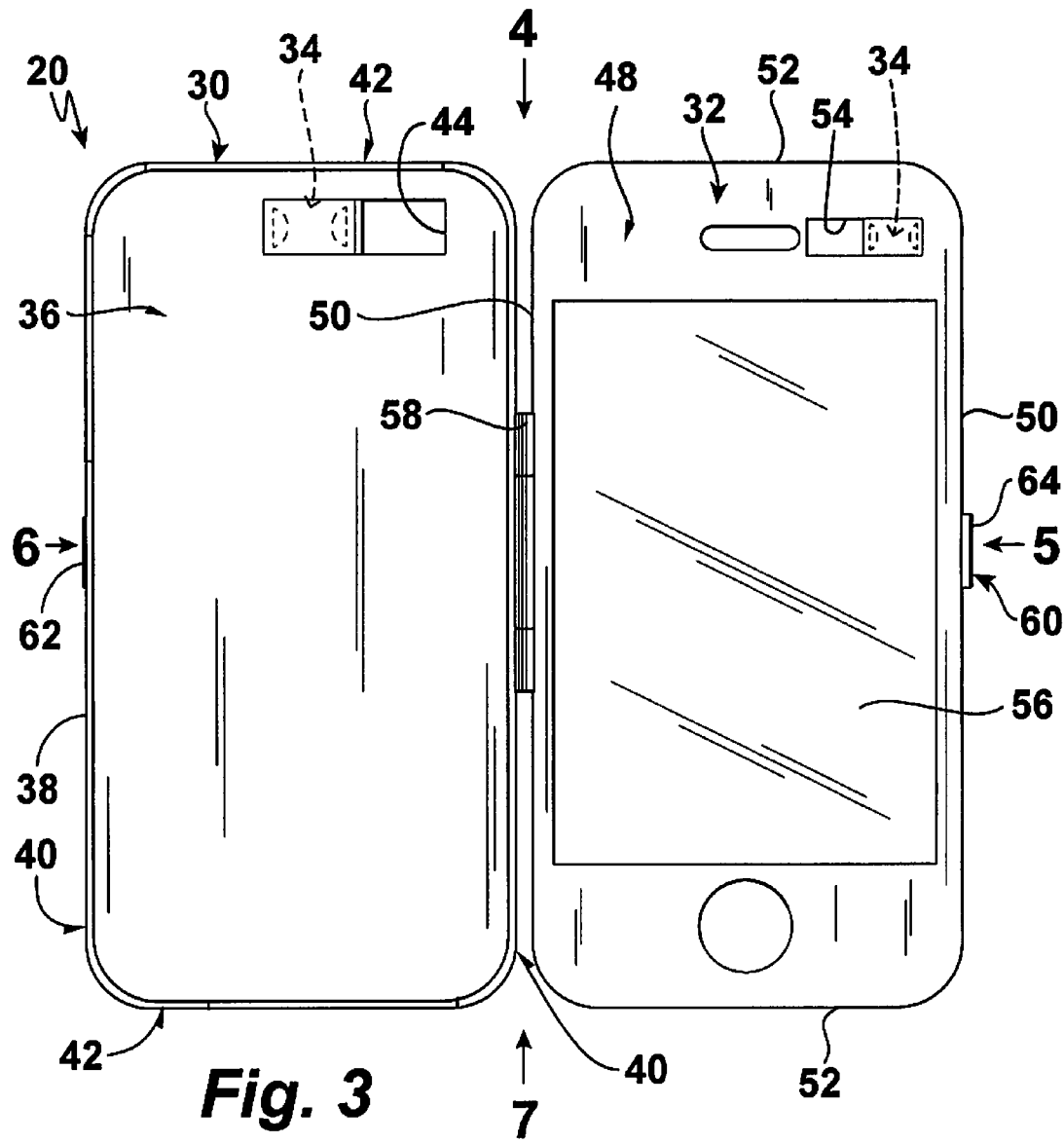
FIG. 3 is a plan view of the inside of the case per se when empty.
Figure 9:
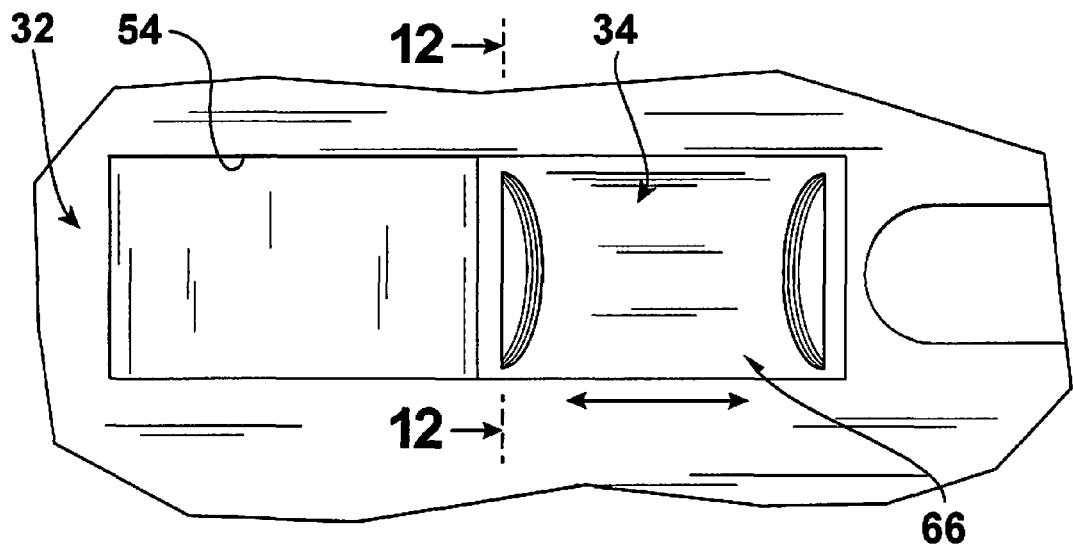
FIG. 9 is an enlarged diagrammatic view of the area enclosed in the dotted ellipse indicated by arrow 9 in FIG. 2 of the door for blocking of any input image information to camera located on the front side of the cell phone enclosed in the case.

A MARSHALING OF REFERENCE NUMERALS UTILIZED IN THE DRAWING 20 first embodiment of case for replaceably enclosing cell phone 22 having at least one audio input 24 and at least one video input 26 and for selectively preventing access to at least one audio input 24 of cell phone 22 and to at least one video input 26 of cell phone 22 by hacker 28
22 cell phone
24 at least one audio input of cell phone 22
26 at least one video input of cell phone 22
28 hacker
30 back portion
32 front portion
34 barriers for selectively preventing access to at least one audio input 24 of cell phone 22 and to at least one video input 26 of cell phone 22 by hacker 28
36 back wall of back portion 30
38 perimeter of back wall 36 of back portion 30
40 pair of long side walls of back portion 30
42 pair of short side walls of back portion 30
44 through bore of back wall 36 of back portion 30 for communicating with one of at least one video input 26 of cell phone 22
46 through bore of lowermost short side wall 42 of back portion 30 for communicating with one of at least one audio input 24 of cell phone 22
48 front wall of front portion 32
50 pair of long sides of front wall 48 of front portion 32
52 pair of short sides of front wall 48 of front portion 32
54 through bore of front wall 48 of front portion 32 for communicating with another one of at least one video input 26 of cell phone 22
56 transparent screen cover of front wall 48 of front portion 32
58 hinge
60 fastener
62 male portion of fastener 60
64 female portion of fastener 60
66 door of each barrier of barriers 34
68 layer of sound proofing insulation
200 second embodiment of case
300 back portion
320 front portion
700 enclosure for allowing cell phone 220 to fit therein
702 upper part of enclosure 700
704 lower part of enclosure 700
706 interlocking clasp
708 male portion of interlocking clasp 706

710 female portion of interlocking clasp 706
800 third embodiment of case
802 front portion
804 back portion
806 top part of back portion 804
808 enclosure for allowing cell phone 820 to slide therein
820 cell phone

DETAILED DESCRIPTION OF THE PREFERRED EMBODIMENT

Referring now to the figures, in which like numerals indicate like parts, and particularly to FIG. 1, a first embodiment of the case of the present invention is shown generally at 20 case for replaceably enclosing a cell phone 22 having at least one audio input 24, such as a microphone, and at least one video input 26, such as a camera, and for selectively preventing access to the at least one audio input 24 of the cell phone 22 and to the at least one video input 26 of the cell phone 22 by a hacker 28.

The configuration of the first embodiment of the case 20 can best be seen in FIGS. 1-7, and as such, will be discussed with reference thereto.

The case 20 comprises a back portion 30, a front portion 32, and barriers 34. The front portion 32 is pivotally attached to the back portion 30. The front portion 32 and the back portion are for replaceably enclosing the cell phone 22. The barriers 34 are movably attached to the back portion 30 and to the front portion 32 and are for selectively preventing access to the at least one audio input 24 of the cell phone 22 and to the at least one video input 26 of the cell phone 22 by the hacker 28.

The back portion 30 is generally rectangular-shaped, and has a back wall 36 with a perimeter 38, a pair of long side walls 40, and a pair of short side walls 42 that are shorter than the pair of long side walls 40 of the back portion 30, respectively.

The pair of short side walls 42 of the back portion 30 and the pair of long side walls 40 of the back portion 30 extend upwardly from the perimeter 38 of the back wall 36 of the back portion 30 for allowing the cell phone 22 to fit therebetween.

The back wall 36 of the back portion 30 has a through bore 44. The through bore 44 of the back wall 36 of the back portion 30 is for communicating with one of the at least one video input 26 of the cell phone 22.

The through bore 44 of the back wall 36 of the back portion 30 is selectively blocked by one of the barriers 34.

A lowermost short side wall 42 of the back portion 30 has a through bore 46. The through bore 46 of the lowermost short side wall 42 of the back portion 30 is for communicating with one of the at least one audio input 24 of the cell phone 22.

The through bore 46 of the lowermost short side wall 42 of the back portion 30 is selectively blocked by another one of the barriers 34.

The front portion 32 is generally rectangular-shaped, and has a front wall 48 with a pair of long sides 50, and a pair of short sides 52 that are shorter than the pair of long sides 50 of the front wall 48 of the front portion 32, respectively.

The front wall 48 of the front portion 32 has a through bore 54. The through bore 54 of the front wall 48 of the front portion 32 is for communicating with another one of the at least one video input 26 of the cell phone 22.

The front wall 48 of the front portion 32 further has a transparent screen cover 56.

The through bore 54 of the front wall 48 of the front portion 32 is selectively blocked by another one of the barriers 34.

The front portion 32 is hingedly attached to the back portion 30 by a hinge 58.

The hinge 58 extends along one long side 50 of the front portion 32 and one long wall 40 of the back portion 30.

The case 20 further comprises a fastener 60.

The fastener 60 comprises a male portion 62 and a female portion 64.

The female portion 64 of the fastener 60 extends along the other long side 50 of the front portion 32.

The male portion 62 of the fastener 60 extends along the other long wall 40 of the back portion 30, and is selectively interlockingly engaged by the female portion 64 of the fastener 60.

The specific configuration of the barriers 34 can best be seen in FIGS. 8-12, and as such, will be discussed with reference thereto.

Each barrier 34 comprises a door 66.

The door 66 of each barrier 34 is slidable attached to an associated one of the back portion 30 and the front portion 32.

The door 66 of the barriers 34 selectively closes an associated one of the through bore 44 of the back wall 36 of the back portion 30, the through bore 54 of the front wall 48 of the front portion 32, and the through bore 46 of the lowermost short side wall 42 of the back portion 30.

Figure 10:
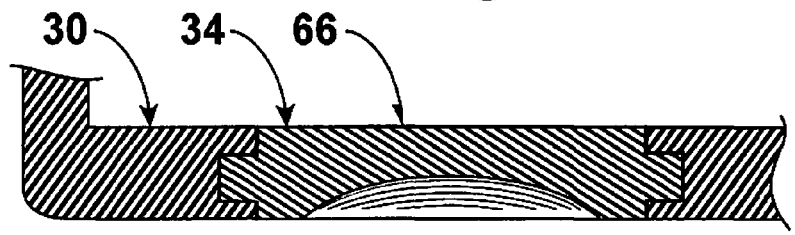
FIG. 10 is a cross sectional view taken along line 10-10 in FIG. 8.
Figure 12:
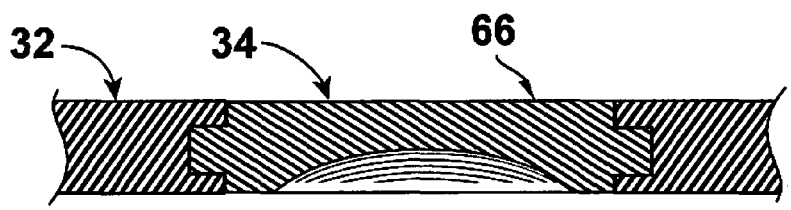
FIG. 12 is a cross sectional view taken along line 12-12 in FIG. 9.
Figure 13:
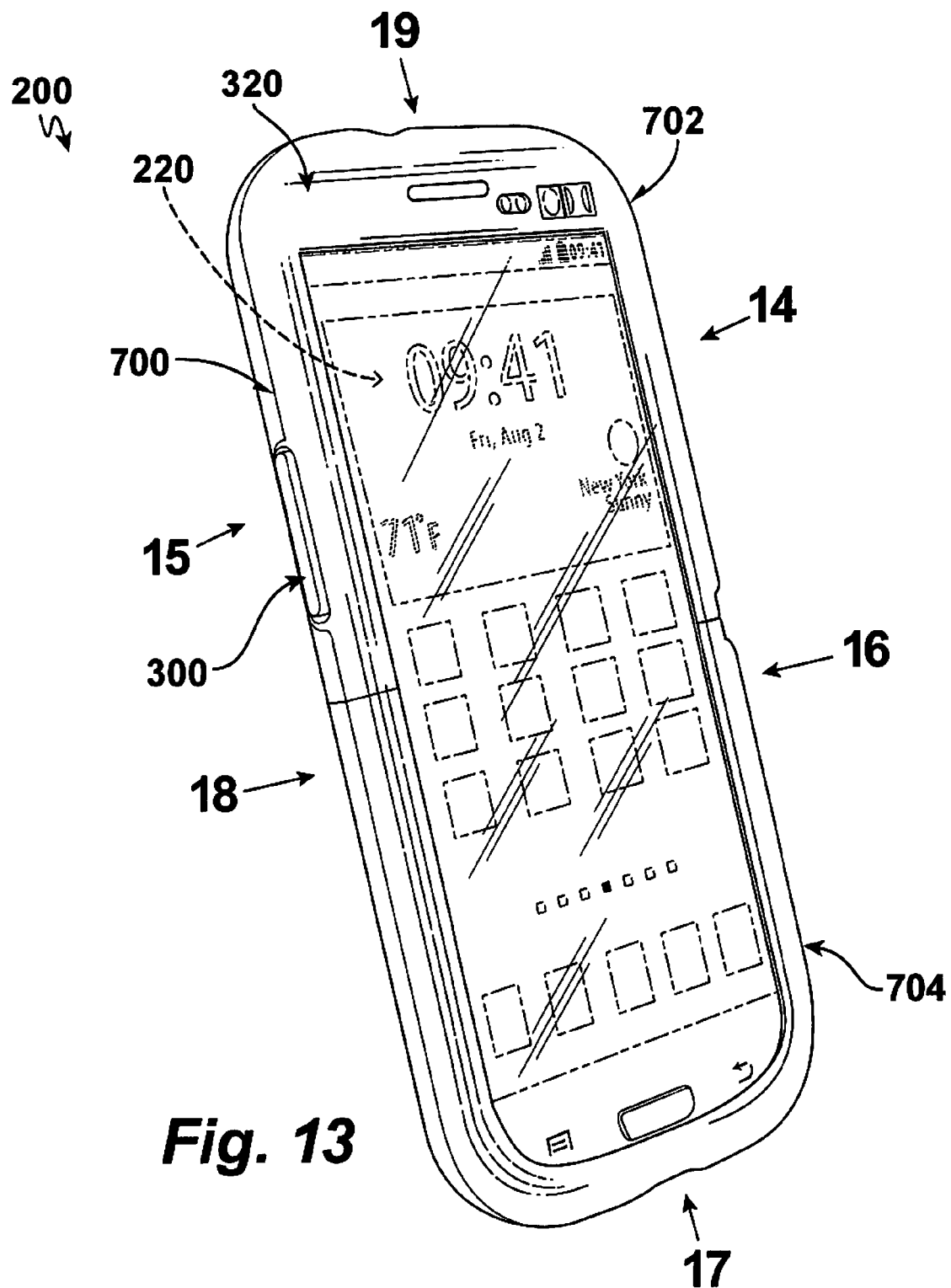
FIG. 13 is a diagrammatic perspective of a cell phone case of a second embodiment of the present invention illustrated with a cell phone installed therein shown in phantom in the case.
Figure 14:
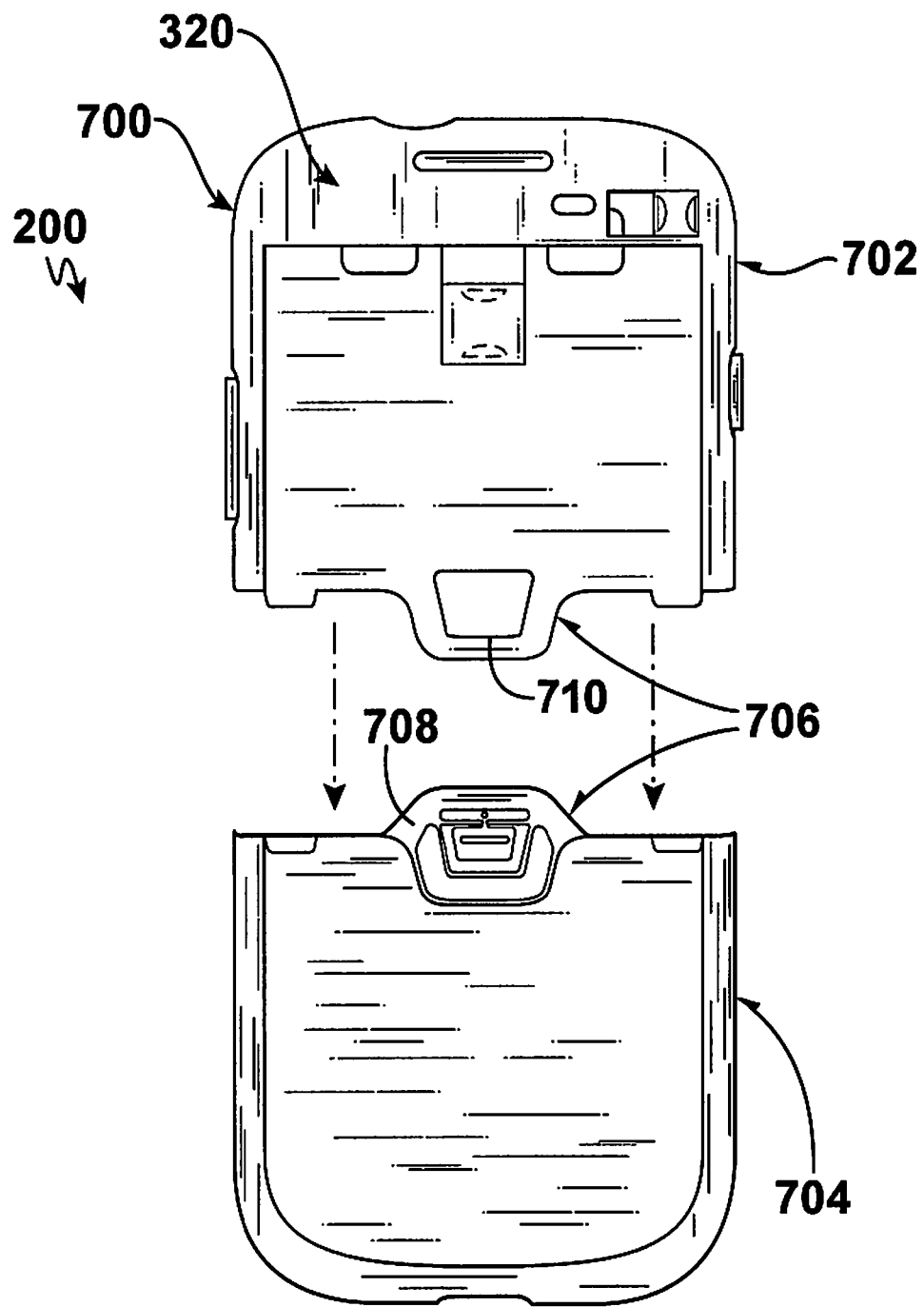
FIG. 14 is a front elevational view thereof showing the two components exploded and separated from each other.
Figure 19:
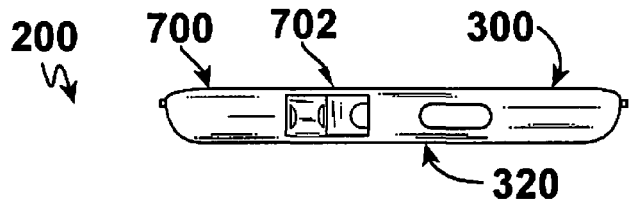
FIG. 19 is a top end plan view taken in the direction of arrow 19 in FIG. 13.
Figures 15, 16, 18:
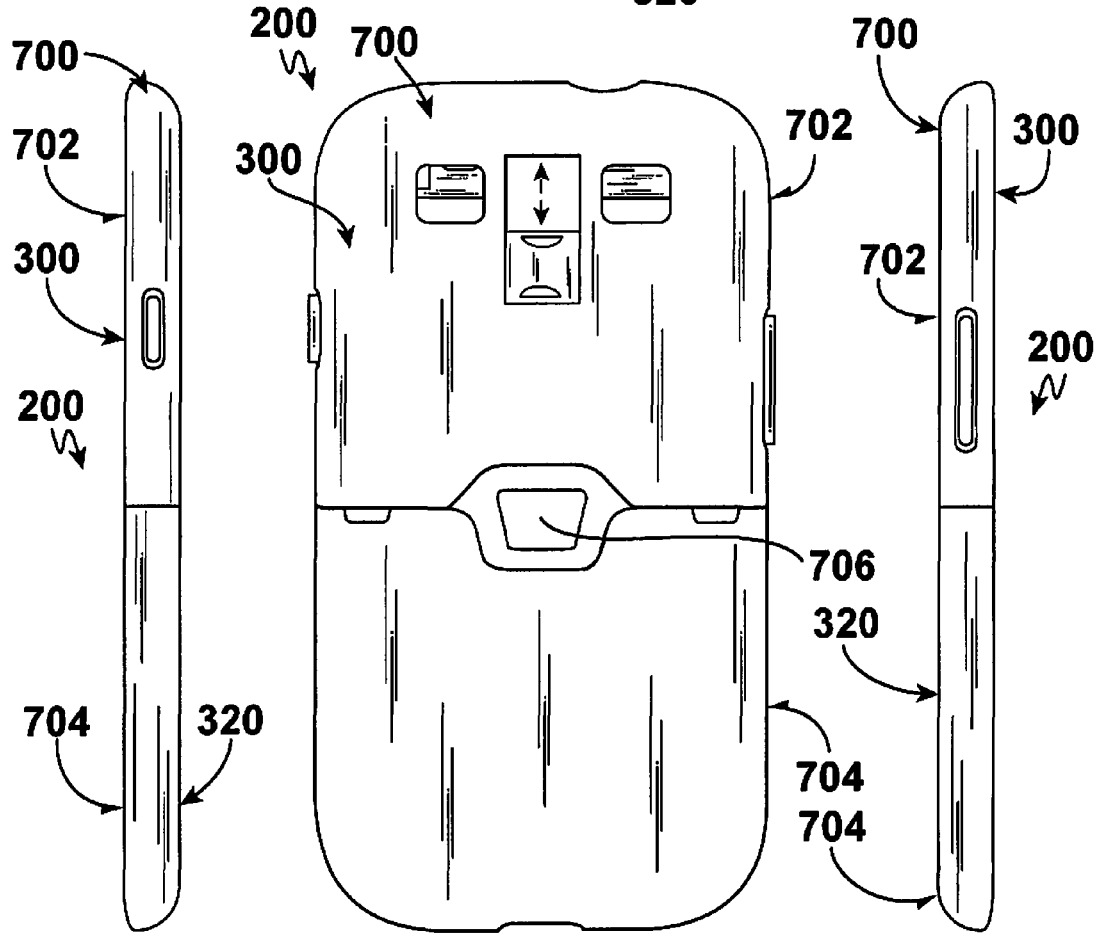
FIG. 15 is a rear elevational view thereof.
FIG. 16 is a side elevational view taken in the direction of arrow 16 in FIG. 13.
FIG. 18 is a side elevational view taken in the direction of arrow 18 in FIG. 13.
Figure 17:
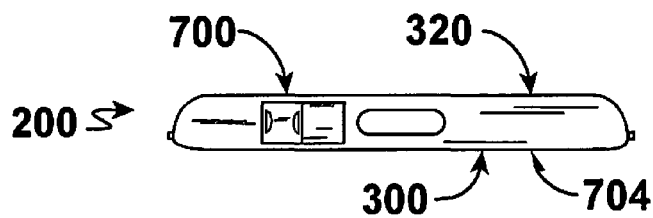
FIG. 17 is a bottom end plan view taken in the direction of arrow 17 in FIG. 13.
Figure 20:
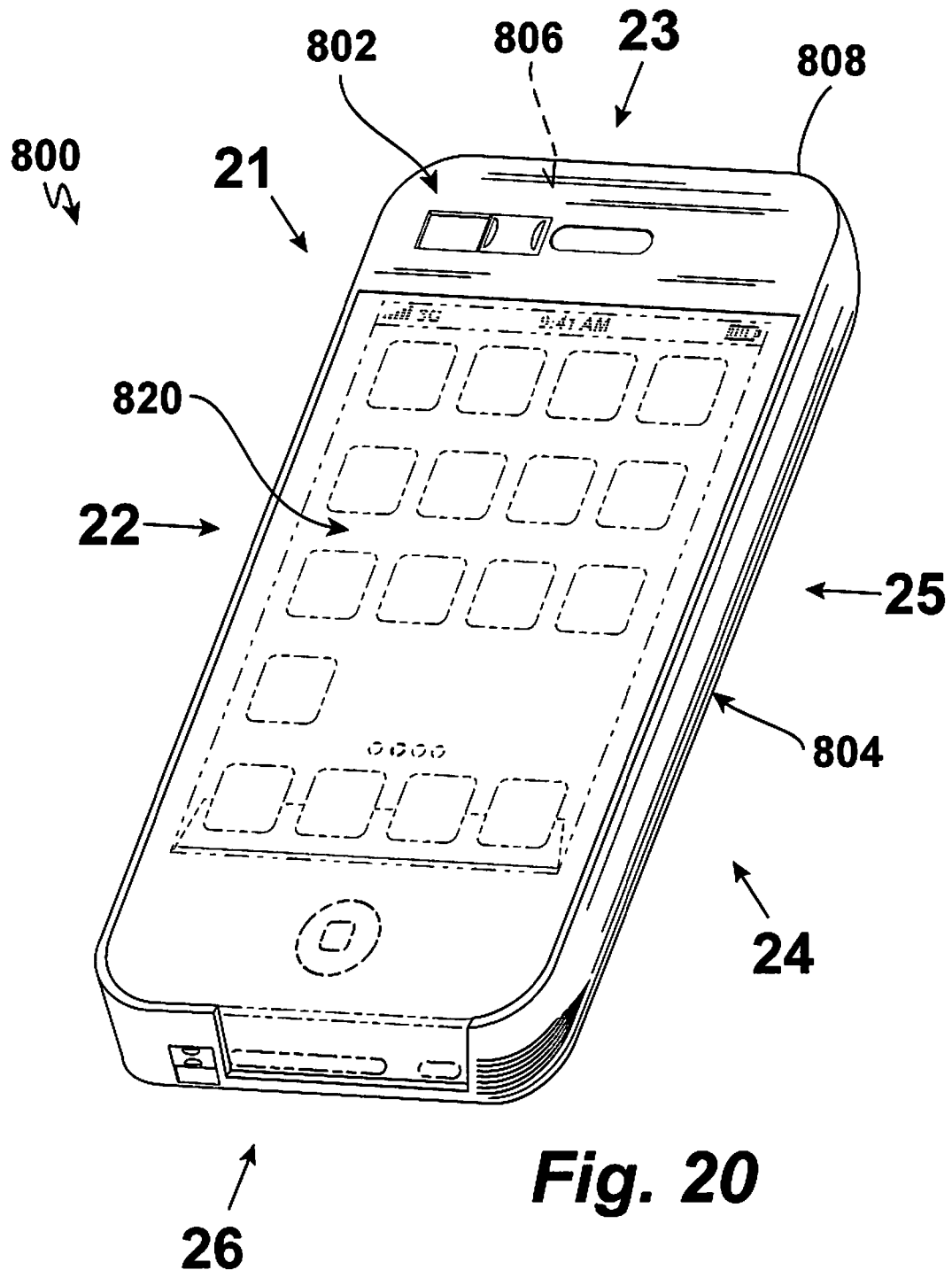
FIG. 20 is a diagrammatic perspective of a cell phone case of a third embodiment of the present invention illustrated with a cell phone installed therein shown in phantom in the case.
Figure 21:
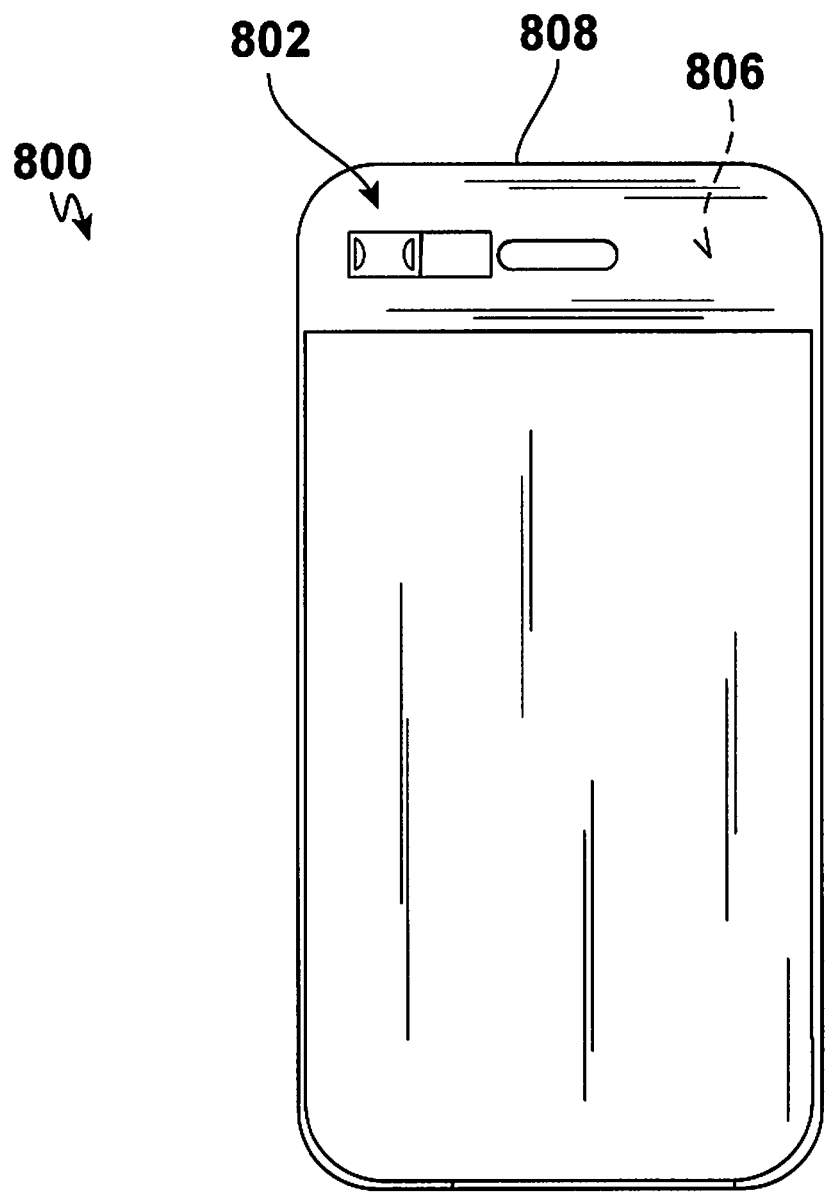
FIG. 21 is a front elevational view thereof pre se.
Figures 22, 23, 24, 25, 26:
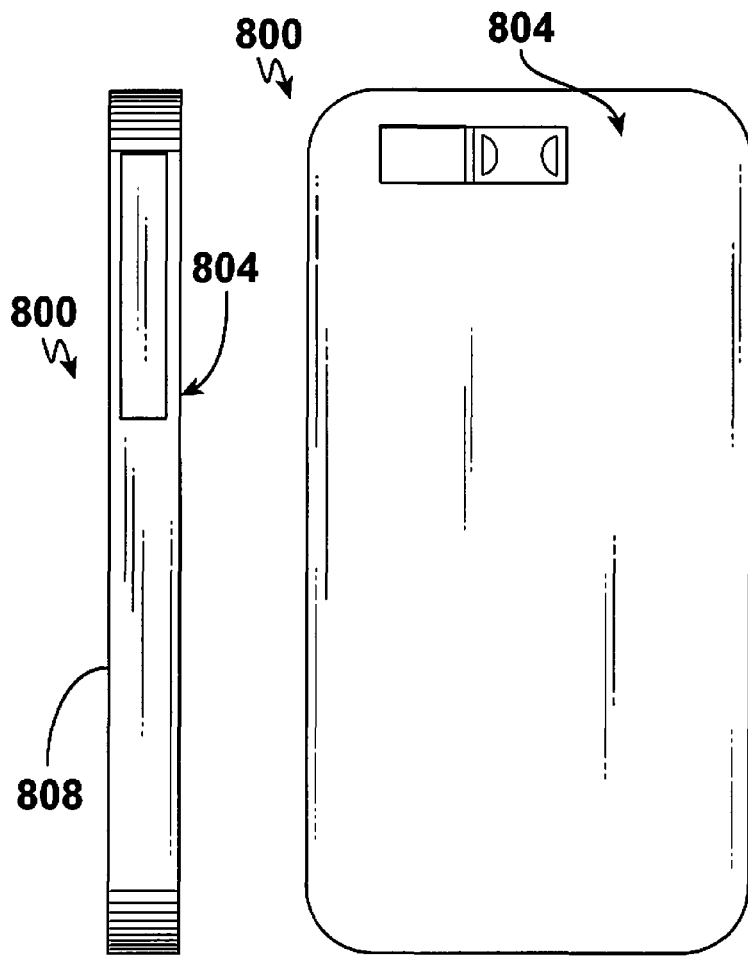
FIG. 22 is a side elevational view taken in the direction of arrow 22 in FIG. 20.
FIG. 23 is a top plan view taken in the direction of arrow 23 in FIG. 20.
FIG. 24 is a back elevational view taken in the direction of arrow 24 in FIG. 20.
FIG. 25 is a side elevational view taken in the direction of arrow 25 in FIG. 20.
FIG. 26 is a bottom plan view taken in the direction of arrow 26 in FIG. 20.

As shown in FIGS. 10 and 12, the door 66 of the barriers 34 that selectively closes an associated one of the through bore 44 of the back wall 36 of the back portion 30, the through bore 54 of the front wall 48 of the front portion 32, and the through bore 46 of the lowermost short side wall 42 of the back portion 30 that is for communicating with the at least one video input 26 of the cell phone 22, respectively, is opaque.

Figure 11:
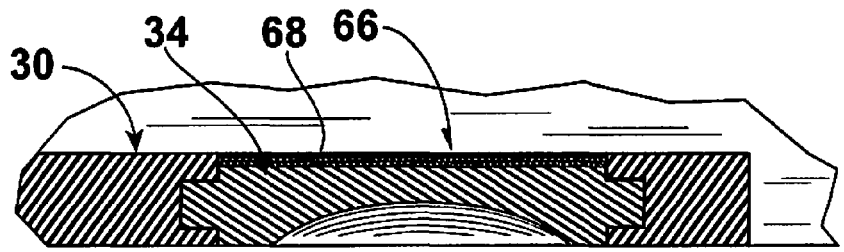
FIG. 11 is a cross sectional view taken along line 11-11 in FIG. 7.

As shown in FIG. 11, the door 66 of the barriers 34 that selectively closes an associated one of the through bore 44 of the back wall 36 of the back portion 30, the through bore 54 of the front wall 48 of the front portion 32, and the through bore 46 of the lowermost short side wall 42 of the back portion 30 that is for communicating with the at least one audio input 24 of the cell phone 22, respectively, has a layer of sound proofing insulation 68 thereon.

The configuration of a second embodiment of the case 200 can best be seen in FIGS. 13-19, and as such, will be discussed with reference thereto.

The configuration of the case 200 is similar to the case 20, except that the front portion 320 and the back portion 300 are affixed to each other to form an enclosure 700. The enclosure 700 is for allowing the cell phone 220 to fit therein.

The enclosure 700 is divided laterally into an upper part 702 and a lower part 704.

The upper part 702 of the enclosure 700 and the lower part 704 of the enclosure 700 are separate and distinct from each other.

The upper part 702 of the enclosure 700 and the lower part 704 of the enclosure 700 are snapingly and replaceably attached to each other by an interlocking clasp 706.

The interlocking clasp 706 allows separation of the upper part 702 of the enclosure 700 and the lower part 704 of the enclosure 700 from each other for positioning the cell phone 220 therein.

The interlocking clasp 706 comprises a male portion 708 and a female portion 710.

The configuration of a third embodiment of the case 800 can best be seen in FIGS. 20-26, and as such, will be discussed with reference thereto.

The configuration of the case 800 is similar to the case 20, except that the front portion 802 and the back portion 804 are affixed to each other, with the front portion 802 closing off only a top part 806 of the back portion 804 to form an enclosure 808. The enclosure 808 is for allowing the cell phone 820 to slide therein.

It will be understood that each of the elements described above, or two or more together, may also find a useful application in other types of constructions differing from the types described above.

While the invention has been illustrated and described as embodiments of a cell phone case for selectively blocking sound and video input, accordingly it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A case for replaceably enclosing a cell phone having at least one audio input and at least one video input and for selectively preventing access to the at least one audio input of the cell phone and to the at least one video input of the cell phone by a hacker, comprising:
   a) a back portion;
   b) a front portion; and
   c) barriers;
   wherein said front portion is attached to said back portion;
   wherein said front portion and said back portion are for replaceably enclosing the cell phone;
   wherein said barriers are movably attached to said back portion and to said front portion; and
   wherein said barriers are for selectively preventing access to the at least one audio input of the cell phone and to the at least one video input of the cell phone by the hacker.

2. The case of claim 1, wherein the at least one audio input is a microphone.

3. The case of claim 1, wherein the at least one audio input is a camera.

4. The case of claim 1, wherein said back portion is generally rectangular-shaped.

5. The case of claim 1, wherein said back portion has a back wall; and
   wherein said back wall of said back portion has a perimeter.

6. The case of claim 5, wherein said back portion has a pair of long side walls.

7. The case of claim 6, wherein said back portion has a pair of short side walls.

8. The case of claim 7, wherein said pair of short side walls of said back portion are shorter than said pair of long side walls of said back portion, respectively.

9. The case of claim 7, wherein said pair of short side walls of said back portion and said pair of long side walls of said back portion extend upwardly from said perimeter of said back wall of said back portion for allowing the cell phone to fit therebetween.

10. The case of claim 7, wherein said back wall of said back portion has a through bore; and
    wherein said through bore of said back wall of said back portion is for communicating with one of the at least one video input of the cell phone.

11. The case of claim 10, wherein said through bore of said back wall of said back portion is selectively blocked by one of said barriers.

12. The case of claim 11, wherein a lowermost short side wall of said back portion has a through bore; and
    wherein said through bore of said lowermost short side wall of said back portion is for communicating with one of the at least one audio input of the cell phone.

13. The case of claim 12, wherein said through bore of said lowermost short side wall of said back portion is selectively blocked by another one of said barriers.

14. The case of claim 13, wherein said front portion has a front wall;
    wherein said front wall of said front portion has a pair of long sides; and
    wherein said front wall of said front portion has a pair of short sides.

15. The case of claim 14, wherein said pair of short sides of said front wall of said front portion are shorter than said pair of long sides of said front wall of said front portion, respectively.

16. The case of claim 14, wherein said front wall of said front portion has a through bore; and
    wherein said through bore of said front wall of said front portion is for communicating with another one of the at least one video input of the cell phone.

17. The case of claim 16, wherein said through bore of said front wall of said front portion is selectively blocked by still another one of said barriers.

18. The case of claim 16, wherein said each barrier comprises a door.

19. The case of claim 18, wherein said door of each barrier is slidably attached to an associated one of said back portion and said front portion.

20. The case of claim 18, wherein said door of said barriers selectively closes an associated one of said through bore of said back wall of said back portion, said through bore of said front wall of said front portion, and said through bore of said lowermost short side wall of said back portion.

21. The case of claim 18, wherein said door of said barriers that selectively closes an associated one of said through bore of said back wall of said back portion, said through bore of said front wall of said front portion, and said through bore of said lowermost short side wall of said back portion that is for communicating with the at least one video input of the cell phone is opaque.

22. The case of claim 18, wherein said door of said barriers that selectively closes an associated one of said through bore of said back wall of said back portion, said through bore of said front wall of said front portion, and said through bore of said lowermost short side wall of said back portion that is for communicating with the at least one audio input of the cell phone has a layer of sound proofing insulation thereon.

23. The case of claim 14, wherein said front wall of said front portion has a transparent screen cover.

24. The case of claim 14, wherein said front portion is hingedly attached to said back portion by a hinge.

25. The case of claim 24, wherein said hinge extends along one long side of said front portion and one long wall of said back portion.

26. The case of claim 25, further comprising a fastener.

27. The case of claim 26, wherein said fastener comprises:
    a) a male portion; and
    b) a female portion.

28. The case of claim 27, wherein said female portion of said fastener extends along the other long side of said front wall of said front portion.

29. The case of claim 27, wherein said male portion of said fastener extends along the a long side wall of said back portion.

30. The case of claim 27, wherein said male portion of said fastener is selectively interlockingly engaged by said female portion of said fastener.

31. The case of claim 1, wherein said front portion is generally rectangular-shaped.

32. The case of claim 1, wherein said front portion and said back portion are affixed to each other to form an enclosure; and wherein said enclosure is for allowing the cell phone to fit therein.

33. The case of claim 32, wherein said enclosure is divided laterally into:
a) an upper part; and
b) a lower part.

34. The case of claim 33, wherein said upper part of said enclosure and said lower part of said enclosure are separate and distinct from each other.

35. The case of claim 33, wherein said upper part of said enclosure and said lower part of said enclosure are snapingly and replaceably attached to each other by an interlocking clasp; and wherein said interlocking clasp allows separation of said upper part of said enclosure and said lower part of said enclosure from each other for positioning the cell phone therein.

36. The case of claim 35, wherein said interlocking clasp comprises:
a) a male portion; and
b) a female portion.

37. The case of claim 1, wherein said front portion and said back portion are affixed to each other, with said front portion closing off only a top part of said back portion to form an enclosure; and wherein said enclosure is for allowing the cell phone to slide therein.

* * * * *